US010542007B2

(12) United States Patent
Caffrey et al.

(10) Patent No.: US 10,542,007 B2
(45) Date of Patent: Jan. 21, 2020

(54) COMMAND AUTHENTICATION RELATED TO THE CONTROL OF INDUSTRIAL SYSTEMS

(71) Applicant: General Electric Company, Schenectady, NY (US)

(72) Inventors: Paul Oliver Caffrey, San Ramon, CA (US); Robert Scott Garry, Greenville, SC (US); Peter Frank Andrews, Salem, VA (US); Clemens Karl Woeste, Horstel (DE); Robert Hugh Putman, San Ramon, CA (US); Gregory Pearson Fry, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 15/856,115

(22) Filed: Dec. 28, 2017

(65) Prior Publication Data

US 2019/0207944 A1    Jul. 4, 2019

(51) Int. Cl.
*H04L 29/06* (2006.01)
*G06F 21/12* (2013.01)
(Continued)

(52) U.S. Cl.
CPC ...... *H04L 63/101* (2013.01); *G05B 19/41855* (2013.01); *G06F 21/121* (2013.01);
(Continued)

(58) Field of Classification Search
CPC .. G06F 21/552; G06F 21/6209; G06F 21/629; G06F 21/62; G06F 21/554;
(Continued)

(56) References Cited

U.S. PATENT DOCUMENTS 6,175,934 B1 * 1/2001 Hershey .............. G06F 11/2294
700/177
7,140,577 B2 * 11/2006 Mollet .................... B61L 7/088
246/218

(Continued)

*Primary Examiner* — Sher A Khan
(74) *Attorney, Agent, or Firm* — Charlotte C. Wilson; James W. Pemrick

(57) ABSTRACT

A method for controlling an operation of an industrial machine that includes authenticating control commands remotely issued by command issuers through a network. The control commands each describe a modifying action to the operation of the industrial machine. The method includes: providing a jump host as a communication buffer between a unit controller of the industrial machine and the network; maintaining within a memory of the jump host whitelisted commands, the whitelisted commands including a list of the approved control commands; receiving, at the jump host, a first control command via the network; determining, at the jump host, whether the first control command is contained within the whitelisted commands; in response to an affirmative determination that the first control command is contained within the whitelisted commands, deeming the first control command as being authenticated; and transmitting the first control command to the unit controller of the industrial machine.

15 Claims, 5 Drawing Sheets

(51) Int. Cl.
  *G06F 21/30*   (2013.01)
  *G05B 19/418*  (2006.01)
  *H04L 29/08*   (2006.01)
(52) U.S. Cl.
  CPC .......... *G06F 21/305* (2013.01); *H04L 63/105* (2013.01); *H04L 63/12* (2013.01); *G05B 2219/31151* (2013.01); *H04L 67/125* (2013.01)
(58) Field of Classification Search
  CPC .............. G06F 21/604; H04L 63/0027; H04L 63/0254; H04L 63/1416; H04L 63/0263; H04L 63/101; H04L 63/105
  See application file for complete search history.

(56)  References Cited

U.S. PATENT DOCUMENTS

| | | | | |
|---|---|---|---|---|
| 7,178,164 | B1* | 2/2007 | Bonnes | G06F 21/604 |
| | | | | 726/2 |
| 8,667,589 | B1* | 3/2014 | Saprygin | H04L 63/0209 |
| | | | | 726/23 |
| 9,407,684 | B2* | 8/2016 | Rezvani | G06F 21/31 |
| 9,413,810 | B2 | 8/2016 | Rezvani et al. | |
| 9,729,579 | B1* | 8/2017 | Marino | H04L 63/20 |
| 2009/0077662 | A1* | 3/2009 | Law | G05B 19/0426 |
| | | | | 726/23 |
| 2010/0281173 | A1* | 11/2010 | Vutukuri | G06F 21/305 |
| | | | | 709/228 |
| 2014/0277801 | A1* | 9/2014 | Cioraca | G05F 1/70 |
| | | | | 700/292 |
| 2017/0013019 | A1* | 1/2017 | Satish | H04L 63/20 |
| 2017/0093887 | A1* | 3/2017 | Schwartz | H04L 63/1416 |

* cited by examiner

COMMAND AUTHENTICATION RELATED TO THE CONTROL OF INDUSTRIAL SYSTEMS

BACKGROUND OF THE INVENTION

The present invention relates to systems and methods for controlling industrial systems, machines, or assets, and, more particularly, but not by way of limitation, systems and methods for authenticating remotely issued control commands for controlling such industrial systems, machines, or assets.

Industrial systems, such as power plants, manufacturing plants, assets, and other machinery, are generally engineered to perform particular tasks as part of a business enterprise or process. Such assets, for example, may include, among other things, gas and steam turbines that drive power plants, wind turbines that generate electricity on wind farms, various types of manufacturing equipment on production lines, aircraft and train engines, and the drilling equipment used in mining operations. As will be appreciated, the efficient implementation of these assets is a complex design challenge, which, to be successful, must anticipate both the physics of the task at hand as well as the environment in which the assets are expected to operate.

As part of this implementation, software and hardware-based controllers have long been the preferred solution for driving and controlling operation. With the rise of inexpensive cloud computing, increasing sensor capabilities and decreasing sensor costs, as well as the proliferation of mobile technologies and networking capabilities, new possibilities have arisen to reshape how industrial assets or machines are designed, operated, managed, and controlled. Specifically, recent advances in sensor technologies now enable the harvesting of new types and vastly more operational data, while progress in network speed and capacity allows essentially real-time transmission of this data to distant locations. This means, for example, that even for a geographical dispersed fleet of like industrial machines, the increased amounts of data gathered at each remote site may be efficiently brought together, analyzed, and employed in ways aimed at improving both fleet and individual asset performance. As a consequence of this evolving, data-intensive, distributed environment, new opportunities have arisen to enhance the value of industrial machines through novel industrial-focused hardware and software solutions.

Within this environment, industrial assets or machines often are remotely located in relation to the computerized controllers that perform optimization and control algorithms intended to improve their performance. For example, remote monitoring and control of gas turbines, especially industrial gas turbines, has become increasingly common. Additionally, the distributed nature of such systems and the many stakeholders involved in operational decision making, typically means that control commands affecting how such industrial machines are deployed and operated may be derived remotely and from various sources. For example, remotely dispersed technicians, operators, owners, and other stakeholders—as well as software analytics running on remote computing systems—may remotely analyze data related to the operation of the asset and then prescribe corrective steps, control actions, commands, or other operational adjustments for improving the performance of the asset. Real time responsiveness may be required for many of these actions, which makes the efficient validation and authentication of incoming control commands an important consideration. Therefore, there exists an on-going need for improved methods and systems for authenticating and authorizing commands being issued by remote systems for the control of industrial assets and machines.

BRIEF DESCRIPTION OF THE INVENTION

The present application thus describes a computer-implemented method for controlling an operation of an industrial machine that includes authenticating control commands remotely issued by command issuers via a network. The control commands each may describe a modifying action to the operation of the industrial machine. The method may include the steps of: providing a jump host as a communication buffer between a unit controller of the industrial machine and the network; maintaining within a memory of the jump host whitelisted commands, the whitelisted commands representing a list of the approved control commands; receiving, at the jump host, a first control command via the network; determining, at the jump host, whether the first control command is contained within the whitelisted commands; in response to an affirmative determination that the first control command is contained within the whitelisted commands, deeming the first control command as being authenticated; and transmitting the authenticated first control command to the unit controller of the industrial machine.

The present application further describes a system for controlling an operation of an industrial machine that includes authenticating control commands remotely issued by command issuers through a network, where the control commands each describing a modifying action to the operation of the industrial machine. The system may include the industrial machine; a unit controller operably connected to the industrial machine for the control thereof; a jump host that is a communication buffer between the unit controller of the industrial machine and the network; one or more hardware processors; and a machine-readable storage medium on which is stored instructions that cause the one or more hardware processors to execute a method. The method may include: maintaining whitelisted commands within a memory of the jump host, the whitelisted commands being a list of the control commands that are approved; receiving, at the jump host, a first control command via the network; determining, at the jump host, whether the first control command is contained within the whitelisted commands; in response to an affirmative determination that the first control command is contained within the whitelisted commands, deeming the first control command as being authenticated; in response to being authenticated, transmitting the first control command to the unit controller of the industrial machine; receiving, at the unit controller, the first control command; and using the unit controller to implement the modifying action of the first control command in controlling the operation of the industrial machine.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
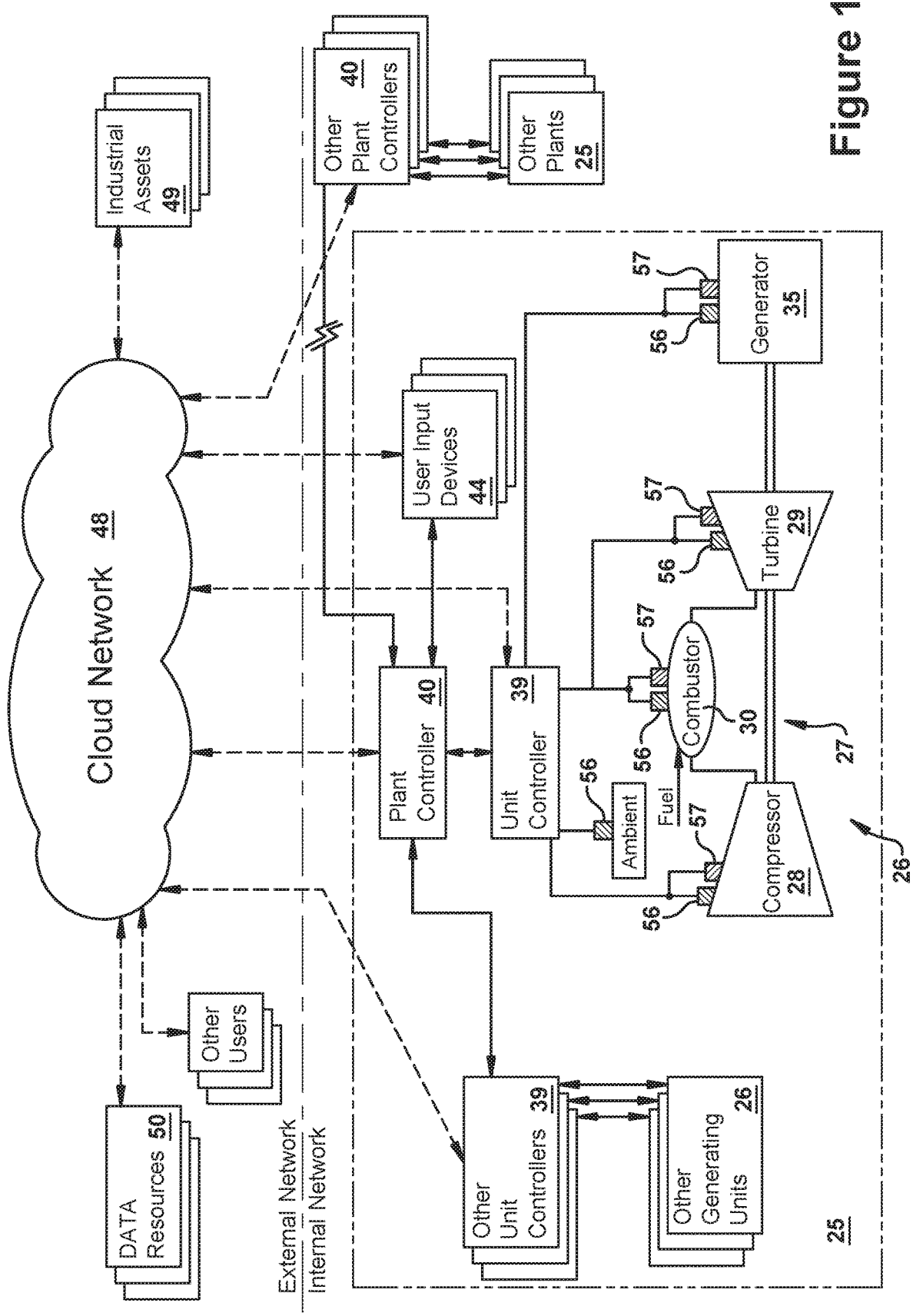
FIG. 1 illustrates a schematic diagram of an exemplary plant having industrial machines, which include a gas turbine, with a control system and cloud network support in accordance with aspects and exemplary embodiments of the present invention or within which such embodiments may be practiced.

By way of background, FIG. 1 is a diagram of an exemplary distributed computing system within an industrial environment in which aspects of the present invention may be practiced. Such a network environment may include industrial enterprises, such as the exemplary plant 25 and related industrial machines 26, as well as control systems and cloud network support in accordance with aspects and embodiments of the present invention or within which such aspects and embodiments may be practiced.

FIG. 1 schematically illustrates an exemplary industrial asset or machine 26, which, as depicted, is a generating unit or gas turbine engine 27. As should be appreciated, such industrial machines 26 may be monitored by a variety of sensors that collect and transmit data to remote computer systems for analysis thereby, as well as control and operational feedback. In general, the gas turbine 27 operates by extracting energy from a pressurized flow of hot gas produced by the combustion of fuel in a stream of compressed air. The gas turbine 27 includes a compressor 28 that is coupled by a common shaft to a downstream turbine section or turbine 29, with a combustor 30 being positioned therebetween. In one example of operation, the rotation of rotor blades within the compressor 28 compresses a flow of air. In the combustor 30, energy is released when the compressed air is mixed with a fuel and ignited. The resulting flow of hot gases from the combustor 30 is then directed over rotor blades within the turbine 29, which induces the shaft to rotate. In this way, the energy of the flow of working fluid is transformed into the mechanical energy of the rotating shaft, which then, for example, may be used to drive the coils of a generator 35 to produce electricity.

Several industrial machines 26—which are depicted in FIG. 1 as other generating units—may be arranged within the plant 25. As will be appreciated, the plant 25 may include any number of subsystems, components, or other assets. It should be understood that FIG. 1 is provided as an exemplary system by which operational data may be gathered within any industrial machine and used for the management thereof. The various industrial machines, thus, may be connected to computer-implemented control systems and communication networks for the control and optimization of performance pursuant to analytics, processes, and other functionality described herein. For example, within such control systems, gathered operational data may be provided electronically to computer-implemented analytics, data repositories, plant or unit controllers, cloud-based services, and/or user input devices so to enable a variety of functions, for example, deriving control setpoints related to the operation of the generating unit, data storage/recall, generating user interfaces, prompting/obtaining user input, decision support for long-term and short-term operations, automated control responses, etc. As will be appreciated, such control systems may send/receive electronic communications to/from each of the systems, subsystems, components, sensors, actuators, and/or other equipment within the plant 25 and/or industrial machines 26, as well as manipulate control settings related thereto in a manner consistent with the functionality described herein.

The industrial machines 26, such as the gas turbine 27, each may include a control system or controller, which will be referred to herein as a unit controller 39, that monitors and controls operation, thereby fulfilling a variety of control requirements as well as protecting against adverse or abnormal operating conditions. For example, the unit controller 39 may perform many functions for the gas turbine 27, including fuel, air and emissions control, sequencing of turbine fuel for start-up, shut-down and cool-down, synchronization and voltage matching of the generator, monitoring of all gas turbine control and auxiliary functions, and protection against unsafe and adverse operating conditions, as well as other functionality which may be described or implied herein. As depicted, in cases where the industrial machine 26 is part of a larger plant 25, the unit controller 39 may connect to a plant controller 40 that controls the operation of the plant 25.

The unit controller 39 and plant controller 40—which also may be referenced herein collectively as "controllers"—each may include a computer system having digital processors or processing resources or capabilities as well as machine-readable storage medium, data storage or memory capabilities. Alternatively, the unit controller 39 and plant controller 40 may be combined into a single controller having an integrated architecture. The unit controller 39, plant controller 40, and the computer system related to each may connect to user interface or input devices 44. Such connections, as illustrated, may be made either through internal or external networks. The input devices 44 may be used to receive and send communications from/to any of the personnel associated with the operation of the plant 25 or industrial machine 26. It should be understood that such input devices 44 may include any conventional computer-implemented device having a user interface, without limitation, including mobile devices and other workstations whether locally or remotely disposed relative to the location of the plant 25 or industrial machine 26. As also shown, the plant 25 may include several other industrial machines 26, each of which may include a unit controller 39 that communicates with the plant controller 40. The plant controller 40 may further connect to other plant controllers 40 associated with the operation of other plants 25, such that the plants 25 may communicate, trade information, and be controlled as a fleet of such plants.

As described in more detail below in relation to FIG. 5, the computer system of each of the controllers 39, 40 may each include one or more processors, memory, and other conventional computing componentry as may be required given any of the functionality described herein. The computer systems related to the controllers 39, 40 may include non-local aspects distributed throughout the several other resources, nodes or devices depicted throughout FIG. 1. For example, these other nodes may include, without limitation:

a communication network, cloud or cloud-based platform (or "cloud network 48" or, more generally, "cloud"); data repositories or other informational resources (herein "data resources" or "data resources 50"); the several input devices 44; and other linked unit controllers, plant controllers, and industrial machines, as may be included. Therefore, it should be understood that the consolidated and localized depiction of the controllers 39, 40 in FIG. 1, as well as the computer systems, processors, and memory resources related to each, is merely exemplary and not meant to limit the manner in which any functionality described herein is performed or executed, unless otherwise stated. Along these lines, it should be further appreciated that reference to the unit controller 39, the plant controller 40, input devices 44 and/or the computer systems associated with each may include computing resources—such as processing, storage, memory, data and communication devices—which are distributed and accessible via internal or plant level networks, as well as by the cloud network 48, as would be understood by one of ordinary skill in the art given a distributed computing environment and the functionality described herein, whether that functionality be expressly stated or implied.

The gas turbine 27, as well as any of the other generating units or industrial machines 26, may include multiple sensors 56 that are configured to monitor particular operational aspects by detecting or measuring various conditions or parameters throughout the engine. For example, the sensors 56 may include temperature sensors, pressure sensors, velocity sensors, flame detector sensors, valve position sensors, as well as any other conventional sensor anticipated given the functionality described herein. As used herein, the term "parameter" refers to measurable physical properties of operation which collectively may be used to define operating conditions within a system. Such operating parameters may include, without limitation, temperature, pressure, humidity, gas flow characteristics, ambient conditions, fuel characteristics, and other measurables, as may be described or implied by any of the functionality described herein.

It will be appreciated that the gas turbine 27, as well as any of the other generating units or industrial machines 26, also may include several actuators 57 by which the control of it is achieved. For example, such actuators 57 may include electro-mechanical devices having variable setpoints or settings that allow for the manipulation of certain process inputs—herein "manipulated variables"—for the control of process outputs—herein "controlled variables"—in accordance with a desired result or mode of operation. The control of the manipulated variables via the actuators 57 must take into account other non-controllable variables—herein "disturbance variables"—which also affect the operation of the industrial machine 26. Thus, for example, the control commands, when implemented by the controllers 39, 40, may cause one or more actuators 57 within the gas turbine 27 to adjust valves between a fuel supply and the combustor 30 to regulate flow level, fuel splits, or fuel type.

The computer systems of controllers 39, 40 execute code or software programs or applications that is configured to control the industrial machines 26 and/or plant 25 pursuant to a desired mode of operation or to maximize performance objectives. Such control may be responsive to operational data supplied by the sensors 56 as well as to instructions received from the input devices 44, and such control may be implemented via manipulating one or more of the actuators 57. In furtherance of this, the input devices 44 may be accessed and used by plant managers, technicians, engineers, operators, energy traders, owners, and/or other stakeholders, as may be described or implied by any of the functionality provided herein. The software executed by the computer system may include scheduling algorithms for regulating any of the systems or subsystems described herein. For example, the software may include schedules and algorithms that accommodate variations in ambient conditions that affect emissions, combustor dynamics, firing temperature limits at full and part-load operating conditions, etc.

In general, the cloud network 48 includes an external network that connects remote industrial machines or plants, as well as a component level network (referred to in FIG. 1 as an "internal network") to other resources, such as other users, other industrial assets 49, and data resources 50. The connections made between the cloud network 48 and any of the other nodes or devices of FIG. 1 may be wired or wireless and/or inclusive of any conventional communication systems or devices. As will be appreciated, the cloud network 48 may be part of a larger communication system or network, including the Internet and/or one or more private computer networks, that has a distributed architecture. In this manner, the controllers 39, 40 may receive information, data, and instructions from and/or send information, data, and instructions to data resources 50. Connection to such data resources 50 may be made via the cloud network 48 or, alternatively, one or more of the data resources 50 may be stored locally and be accessed outside of the cloud network 48 via a private or internal network.

Keeping in mind the aspects described above in relation to a distributed computing system and network within an industrial environment, attention will now turn to FIGS. 2 through 5 for the disclosure of exemplary embodiments of the present invention. As will be seen, these exemplary embodiments relate to the authentication of control actions or commands for controlling or modifying the operation of one or more industrial assets or machines.

Figure 2:
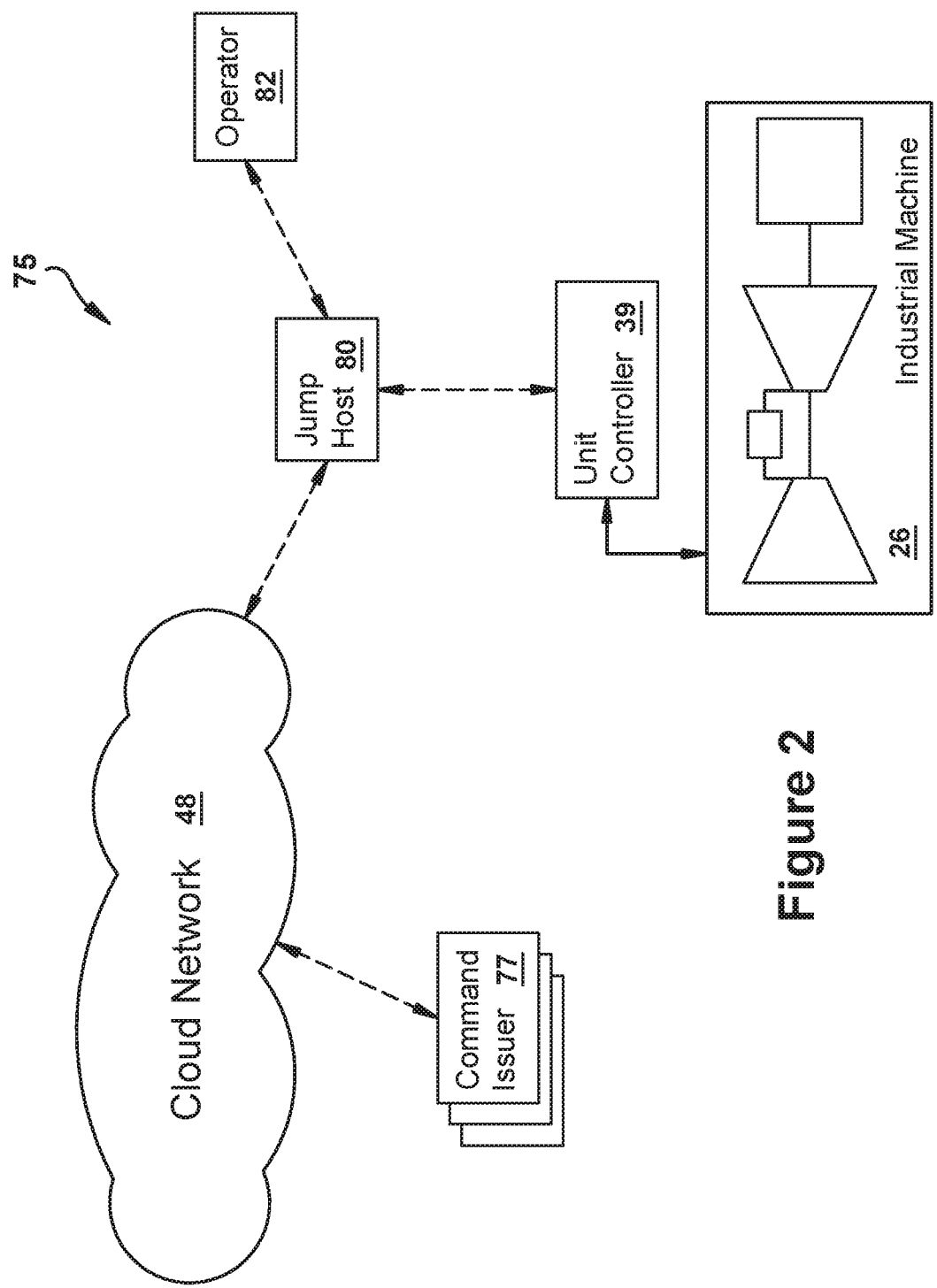
FIG. 2 schematically illustrates an authentication system and method for the authentication of control commands in accordance with an embodiment of the present invention.

With specific reference to FIG. 2, an authentication system 75 is schematically illustrated that relates to the authentication of control commands (also "commands") in accordance with embodiments of the present invention. As illustrated, the authentication system 75 of the present invention may include networked interactions between several main participants or nodes that communicate across a distributed computing network, such as, for example, the one presented above in relation to FIG. 1. More specifically, the authentication system 75 may include a cloud network 48, one or more command issuers 77, a jump host 80, an operator 82 of the jump host 80, a unit controller 39, and an industrial asset or machine 26 (which, for example, is depicted as a gas turbine) that is controlled by the unit controller 39.

As used herein, the jump host 80—which also may be referred to as a "jump server" or "jump box"—represents a secure administrative host or special-purpose computer that provides a secure connection between a wide area network, such as the depicted cloud network 48, and the unit controller 39 of the industrial machine 26, which is maintained within local network that resides within a separate, more controlled security zone. Thus, as will be appreciated, the jump host 80 may be configured as a hardened and monitored device that spans two dissimilar security zones and, thereby, provides a controlled and secure means of access between them. The jump host 80 may be placed between a secure zone, such as a secure local area network or connection by which it communicates with the unit controller 39, and a less secure wide area network, such as the cloud network 48 and/or the internet. Thereby, the jump host 80 may provide secure and transparent management of a controller of an industrial machine. Further, the jump host 80 may act as a single audit point for traffic or communications to the unit controller 39, particularly those communications that include control commands modifying the operation of the industrial machine 26. As will be appreciated, access to the jump host 80 may be tightly controlled and monitored. For example, according to exemplary embodiments, only an approved and authenticated operator 82 may be able to access to the jump host 80. For example, the operator 82 may be required to log into the jump host 80—for example, by verifying his/her identity—to gain access and make any configuration changes to the jump host 80. All such changes may be recorded, logged and stored at the jump host 80 for later audit.

According to the present invention, the command issuers 77 of the authentication system 75 are broadly defined to include any party or computing device approved for issuing control commands to the unit controller 39 for the control of the industrial machine 26. According to exemplary embodiments, the command issuer 77 may be an analytic program operating on a computer system that is remotely located in relation to the industrial machine 26. In such cases, the analytic program may receive information and data concerning the current operation of the industrial machine 26 and then use that data in an algorithm to enhance or optimize the operation or performance of the industrial machine.

Figure 3:
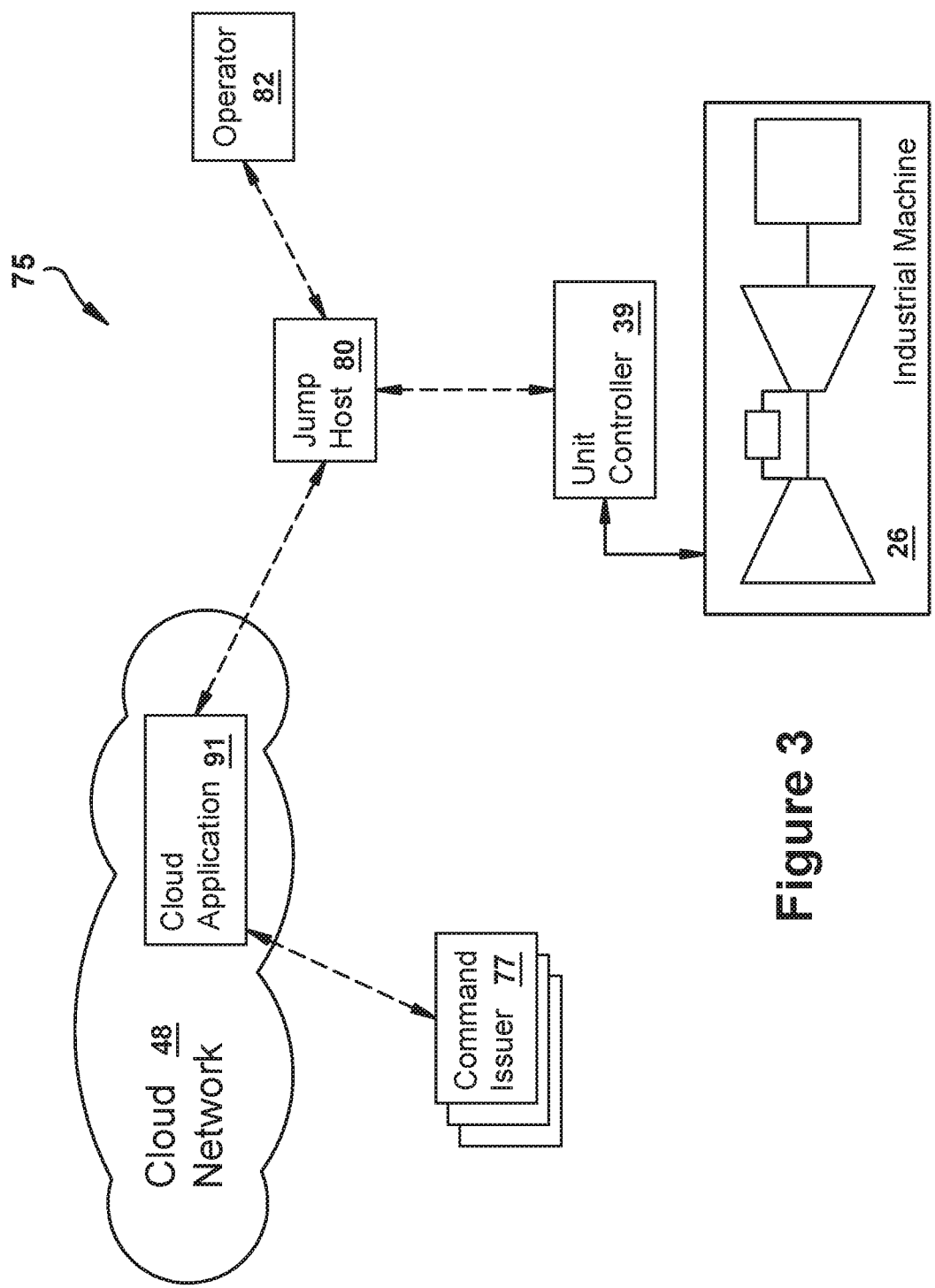
FIG. 3 schematically illustrates an authentication system and method for the authentication of control commands in accordance with an alternative embodiment of the present invention.

With reference to FIG. 3, an alternative authentication system 75 in accordance with the present invention is provided that also may be used to authenticate remotely issued control commands. As will be seen, the authentication system 75 of FIG. 3 includes a cloud application 91 that differentiates it from the system introduced in FIG. 2. According to exemplary embodiments, the cloud application 91 is a software application operated within the cloud, for example, within the depicted cloud network 48. When present, the control commands may be routed through the cloud application 91. That is, transmissions between command issuers 77 and the jump host 80 may travel through the cloud application 91. As discussed more below in relation to FIG. 4, the cloud application 91 may be included within the authentication system 75 to provide an additional layer of authentication and security, for example, an initial screen test may be performed within the cloud application 91 before control commands are transmitted to the jump host 80.

Figure 4:
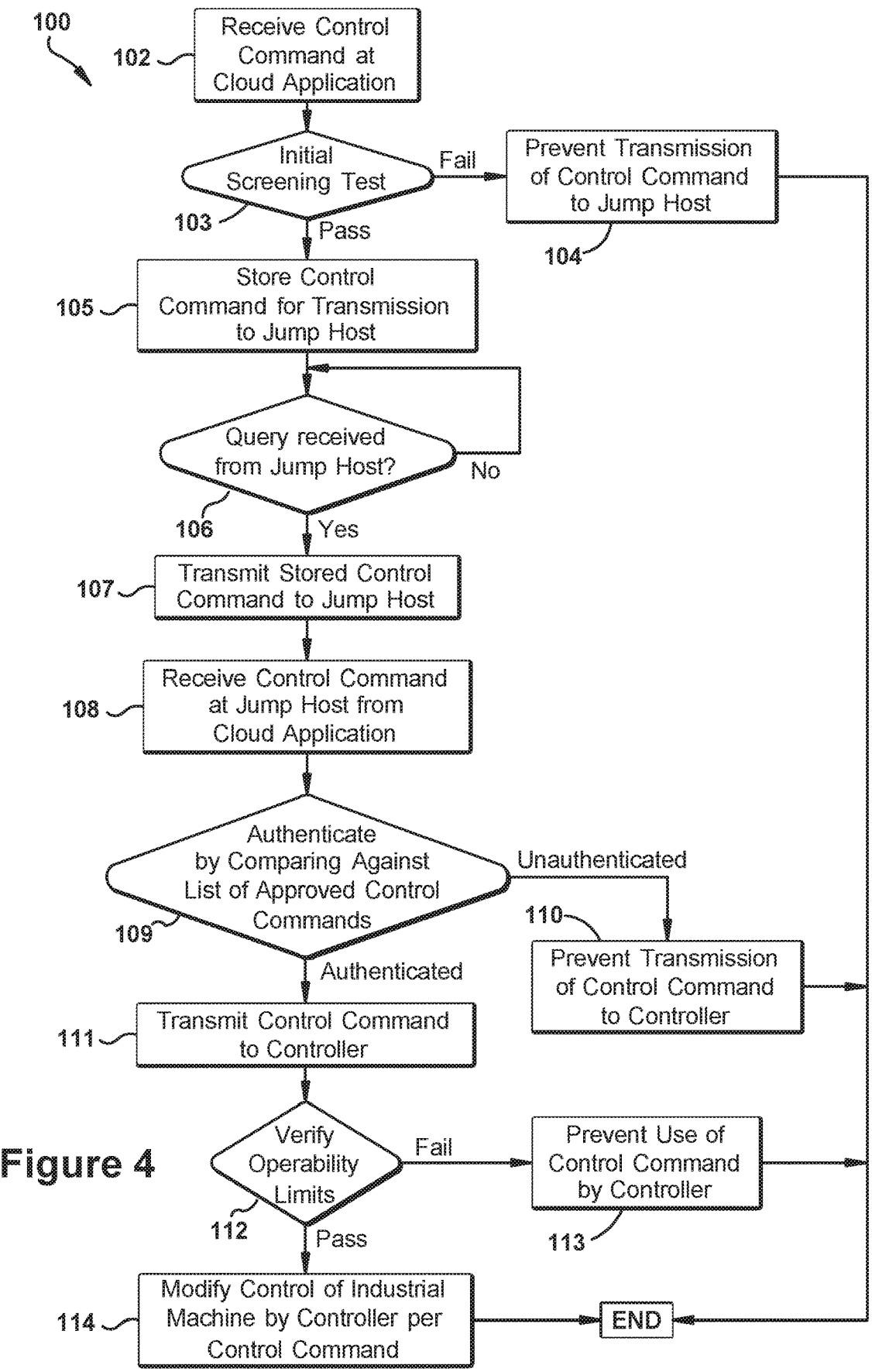
FIG. 4 illustrates an authentication method for the authentication of control commands in accordance with an embodiment of the present invention.

With continued reference to the authentication systems of FIGS. 2 and 3, a method of the present invention will be disclosed in relation to the flow diagram of FIG. 4 to illustrate an exemplary mode of operation. In general, it should be appreciated that methods of the present invention relate to processes for controlling the operation of industrial machines via authenticated control commands that are issued remotely by one or more command issuers 77 over a network connection. As used herein, such control commands are defined as those that include a modifying action. Such modifying actions, as used herein, are ones that results in a modification to the control and operation of the industrial machine 26. While the methods of the present invention may include more or less steps—which may be arranged in alternative orders—an exemplary method includes the following steps: providing a jump host 80 as a communication buffer between a unit controller 39 of an industrial machine 26 and a network, such as a wide area network or cloud network 48; maintaining within a memory of the jump host 80 a list of approved control commands for the industrial machine 26 (which may be referred to herein simply as "whitelisted commands"); receiving, at the jump host 80, a control command via the network for authentication; authenticating the control command by determining, at the jump host 80, whether the control command is contained within the whitelisted commands; in response to an affirmative determination that the control command is contained within the whitelisted commands, deeming the control command as being authenticated; and, given this determination, transmitting the authenticated control command to the unit controller 39 of the industrial machine 26 for use thereby. As will be seen, alternative embodiments of the present invention also include the steps of receiving, at the unit controller 39, the authenticated control command, and then, using the unit controller 39, implementing the modifying action included within the received authenticated control command to modify the operation of the industrial machine 26.

As stated, the modifying action of the control command results is one that results in or makes a change to the current operation of the industrial machine 26. For example, the modifying action may include or result in a change to a setting of at least one actuator that controls a manipulated variable relating to the operation of the industrial machine 26. As another example, the modifying action may be one that results in a change in value of a manipulated variable associated with the current operation of the industrial machine 26. Or, the modifying action of the control command may be one that results in a change in value to a controlled variable associated with the current operating mode or operation of the industrial machine 26. According to an exemplary embodiment, it should be appreciated that the industrial machine 26 may be a power generating unit, such as, for example, a gas turbine, a steam turbine, or a combine cycle power plant having a gas and a steam turbine.

The present invention may further include one or more steps by which certain aspects of the authentication system are initially setup or configured, as well other steps by which those aspects may be later modified. For example, exemplary embodiments of the present invention may include the initial step of inputting the whitelisted commands into the jump host 80. This step may be accomplished by an operator 82 entering each of the approved control commands of the whitelisted commands into the memory of the jump host 80 via a secure communication link that is established between an operator device and the jump host 80. Establishing the secure communication link may be done via any conventional means for determining an identify of the person making such inputs.

The types of approved control commands included within the whitelisted commands may include any that satisfy the any of the conditions described herein. As used herein, such control commands may be broadly defined as one that includes a modifying action that affects the operation of the industrial machine 26. For example, in regard to the type of control commands that would be included for a generating unit, such as a gas turbine, these may include: an output generating level; a set point for a manipulated variable; a set point for a controlled variable; a change in operating mode, such as turndown or shutdown operation, as well as other similar control commands. The whitelisted commands may be chosen or derived from past control commands that were successfully issued and implemented by the unit controller 39 toward the operation of the industrial machine 26. As should be understood, once the whitelisted commands are initially inputted, the method of the present invention may further include steps by which the whitelisted commands are revised, where such revisions are defined as altering at least one of the approved control commands. Such revisions may be made by the operator 82 via a secure communication link with the jump host 80.

According to preferred embodiments, the whitelisted commands—i.e., the list of approved control commands—are organized and generated such that each of the approved control commands included therein is given a unique syntax string identifier. It is this unique syntax string identifier that differentiates each of the included control commands from each of the other control commands within the whitelisted commands. Further, methods of the present invention may include providing or transmitting to the command issuers 77 the respective unique syntax string identifiers of one or more of the control commands within the whitelisted commands. As part of the present invention, each of the command issuers 77 may be approved to use only a subset of the total control commands within the whitelisted commands and, thus, may be sent only those for which it is approved. As should be understood, according to present invention, it is this knowledge and/or proper usage of the unique syntax string identifiers by the command issuers 77 enables their usage while also preventing unauthorized parties that have no such knowledge from doing the same. That is, without having knowledge of the unique syntax string identifier, a command issuer 77 is unable to successfully send to the unit controller 39 the control command that corresponds to it. As will also be seen, the knowledge and proper usage of the cloud application 91 by the command issuers 77—including a network address of the cloud application 91 that otherwise would remain hidden—represents another security provision that prevents unauthorized control commands from being sent to the unit controller. Thus, the present method may further include the step of transmitting information to the command issuers 77 that enables each to locate, access, and communicate with the cloud application 91. Further, the present system may include a plurality of such cloud applications 91, with each of the command issuers 77 knowledgeable about only a subset of the total. In relation to this, the present invention may further include transmitting the unique syntax string identifiers of the whitelisted commands to the one or more cloud applications 91 for storage in the memory thereof. As described below, the one or more cloud applications 91 may then use those received unique syntax string identifiers in a screening test for initially approving the control commands received from the command issuers 77 before those control commands can be passed to the jump host 80.

Turning now with specificity to FIG. 4, the present invention includes a method 100 for approving and authenticating control commands. The method 100 may commence at a step 102 where a control command that is sent by a command issuer 77 is received at a cloud application 91. As stated, the cloud application 91 may be a software application running within a wide area network, such as the cloud network 48, and, in accordance with an exemplary embodiment, the control commands may be routed through the cloud application 91 before being transmitted to the jump host 80. It should be understood that the exemplary method 100 of FIG. 4 is described as including functionality (steps 102 through 107) that relates primarily to instances when the authentication system includes the cloud application 91. It should be appreciated that these steps are primarily applicable to the operation of the authentication system provided in FIG. 3 because it is that system embodiment that includes the cloud application 91. For system embodiments of the present invention that do not include the cloud application 91—such as the system embodiment shown in FIG. 2—it should be understood that the corresponding methods may skip the functionality provided in steps 102 through 107 and, instead, would commence at step 108 of FIG. 4.

At a step 103, the method 100 of the present invention includes performing an initial screening test within the cloud application 91. Specifically, the control command received by the cloud application 91 is subjected to an initial screening test that is administered within the cloud application 91. According to preferred embodiments, this initial screening test includes determining whether the received control command is one that is contained within the whitelisted commands, i.e., the list of approved control commands. The determination as to whether the received control command is contained within the whitelisted commands is achieved by comparing the unique syntax string identifier of the received control command against the unique syntax string identifiers of each of the control commands within the whitelisted commands. For example, this comparison is completed to determine whether an exact match exists, which would result in the received control command "passing" the initial screening test. Thus, if it is affirmatively determined that the received control command is contained within the whitelisted commands, the received control command is deemed to have passed the initial screening test. If, on the other hand, the comparison determines that an exact match does not exist, the received control command is deemed to have failed the initial screening test. As shown by step 104, when the initial screening test is failed in this way, the cloud application 91 may function to prevent the transmission of the received control command to the jump host 80. As indicated, at that point, the method 100 may terminate by proceeding to "end", or, alternatively, the method 100 could loop back to the beginning step in anticipation of the next control command being received.

When the initial screening test is passed, methods of the present invention could function so that the cloud application 91 then immediately transmits the control command to the jump host 80. Alternatively, as shown in the method 100 of FIG. 4, the control command that passed the initial screening test (or "passed control command") may be stored at the cloud application 91 for eventually being transmitted to the jump host 80 upon the occurrence of a triggering event. Specifically, the passed control command may be stored in the memory of the cloud application 91 for transmission to the jump host 80 once a query is received from the jump host 80. Thus, as indicated in step 106, the cloud application 91 may be configured to monitor or look for such a query being sent to it from the jump host 80, where that query asks whether the cloud application 91 has stored any passed control commands that have not previously been transmitted to the jump host 80. The jump host 80 may be configured to periodically send such queries to the cloud application 91, which, for example, ask whether the cloud application 91 has stored any control commands that have both passed the initially screening test, but not already been transmitted to the jump host 80 (such as, for example, in response to a previous such query sent from the jump host 80). As indicated in step 107, in response to such queries from the jump host 80, the cloud application 91 may transmit any such control commands that satisfy the above qualifications.

At step 108, the control command, which was transmitted from the cloud application 91, is received at the jump host 80. Once received, at step 109, the control command may then be authenticated by the jump host 80. According to exemplary embodiments, this authentication includes determining, at the jump host 80, whether the control command is contained within the whitelisted commands. Specifically, the test for authentication may include again determining whether the received control command is contained within the whitelisted commands, i.e., the list of approved control commands. As with the initial screening test, the step of determining whether the received control command is contained within the whitelisted commands may include comparing the unique syntax string identifier of the received control command against the respective unique syntax string identifiers of the control commands that make up the whitelisted commands. This may be done to determine whether an exact match exists. In response to an affirmative determination that the unique syntax string identifier of the received control command is contained within the whitelisted commands, the received control command may then be deemed as authenticated at the jump host 80. As a result of that authentication, as indicated by step 111, the authenticated control command is then transmitted to the unit controller 39.

If, on the other hand, the test for authentication results in a negative determination—i.e., that the unique syntax string identifier of the received control command was not found to be contained within the whitelisted commands—the jump host 80 may then deem the control command as being unauthenticated. In this case, as indicated by step 110, the method 100 may then prevent the received control commands from being transmitted to or used by the unit controller 39 of the industrial machine 26. For auditing purposes, the method 100 may further include the step of logging, within the memory of the jump host 80, a record of each of the authenticated and unauthenticated control commands. In response to a query sent from the operator 82 via a secure communication link, the jump host 80 may transmit to the operator 82 any of records pertaining to authenticated and unauthenticated commands.

Once the control command has been transmitted to the controller 39, the method 100 may further include a step 112 where it is verified to be within the operability limits of the industrial machine 26. More specifically, the control command (and/or the modifying action included with the control command) may be verified as being one that is achievable while also observing or maintaining the operability limits associated with the industrial machine 26. If this is found to not possible and the control command, thus, fails this test, at step 113, the method 100 may include preventing the control command from being used by the unit controller 39. On the other hand, if the control command is found to be achievable while still maintaining all operability limits of the industrial machine and, thus, passes this test, at step 114, the method 100 may include allowing the operation of the industrial machine 26 to be controlled and/or modified pursuant to the control command via the unit controller 39.

Figure 5:
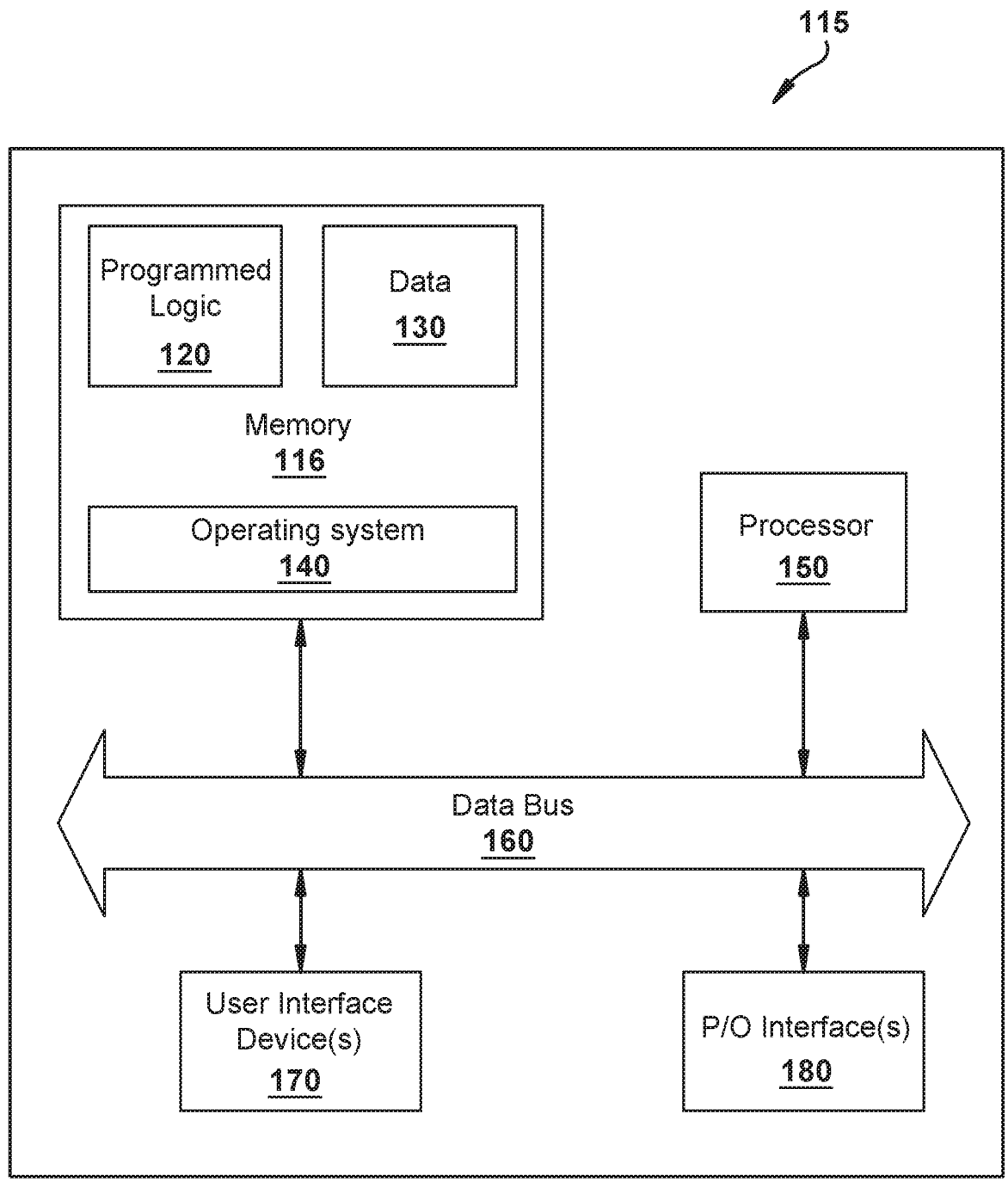
FIG. 5 depicts a schematic diagram illustrating an example computer system for performing any one or more of the methods discussed herein.

FIG. 5 depicts a schematic diagram illustrating an example computer system 115 for performing any one or more of the methods discussed herein, in accordance with various embodiments of the present invention. More specifically, elements of the computer system 115 may be used to implement aspects of the command authentication systems and methods described above, including those associated with the functionality of any of the various participant nodes, including, without limitation, those of the command issuer 77, the cloud network 48, the cloud application 91, the jump host 80, the device of the operator 82, and/or the unit controller 39.

The computer system 115 may include a memory 116 that stores programmed logic 120 (e.g., software) and data 130. The memory 116 also may include an operating system 140.

A processor 150 may utilize the operating system 140 to execute the programmed logic 120, and in doing so, may also utilize the data 130. A data bus 160 may provide communication between the memory 116 and the processor 150. Users may interface with the computer system 115 via at least one user interface device 170, such as a keyboard, mouse, touchscreen, gesture control device, wearable computer, control panel, or any other device capable of communicating data to and from the computer system 115. The computer system 115 may be in communication with customer equipment and its associated devices online, including sensors or data recorded from such sensors, while operating, as well as in communication with the customer equipment and its associated devices offline while not operating, via an input/output (I/O) interface 180. More specifically, the computer system 115 may carry out the execution of model-based instructions for, but not limited to, providing command signals to certain devices of the customer equipment and/or its associated devices, as provided herein. The computer system 115 and the programmed logic 120 implemented thereby may include software, hardware, firmware, or any combination thereof. It should also be appreciated that multiple controllers or processors may be used in the computer system 115, whereby different features described herein may be executed on one or more different controllers or processors.

Accordingly, embodiments described herein facilitate systems and methods for authenticating control commands. References are made to block diagrams of systems, methods, apparatuses, and computer program products according to example embodiments. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed. The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks. One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and so forth.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A computer-implemented method for controlling an operation of an industrial machine that includes authenticating control commands remotely issued by command issuers through a network, the control commands each describing a modifying action that modifies the operation of the industrial machine, the method comprising the steps of:
    providing a jump host as a communication buffer between a unit controller of the industrial machine and the network;
    maintaining whitelisted commands within a memory of the jump host, the whitelisted commands comprising a list of the control commands that are approved;
    receiving, at the jump host, a first control command via the network;
    determining, at the jump host, whether the first control command is contained within the whitelisted commands, wherein the step of determining whether the first control command is contained within the whitelisted commands comprises:
        determining a unique syntax string identifier for the first control command; and
        comparing the unique syntax string identifier of the first control command against the unique syntax string identifiers of the control commands within the whitelisted commands and, therefrom, determining whether the unique syntax string identifier of the first control command exactly matches any of the unique syntax string identifiers of the control commands within the whitelisted commands;
    in response to an affirmative determination that the first control command is contained within the whitelisted commands, deeming the first control command as being authenticated;
    in response to being deemed authenticated, transmitting the first control command to the unit controller of the industrial machine;
    providing a cloud application through which the control commands are routed in transit between the command issuer and the jump host, the cloud application being accessible via the network;
        receiving at the cloud application the first control command issued by the command issuer;
        storing the first control command within a memory of the cloud application;
        periodically sending a query from the jump host to the cloud application regarding whether the cloud application has a stored one of the control commands that has not already been transmitted to the jump host; and
        in response to the query from the jump host, transmitting the first control command from the cloud application to the jump host; and
    receiving, at the unit controller, the first control command, and using the unit controller to implement the modifying action of the first control command in controlling the operation of the industrial machine.

2. The computer-implemented method according to claim 1, further comprising the step of inputting the whitelisted commands into the jump host;
    wherein the step of inputting the whitelisted commands comprises entering each of the control commands within the whitelisted commands into the memory of the jump host via a secure communication link between an operator device and the jump host; and
    wherein the modifying action includes an action resulting in a change to a setting of at least one actuator that controls a manipulated variable relating to the operation of the industrial machine.

3. The computer-implemented method according to claim 2, further comprising the step of revising the whitelisted commands;
    wherein the step of revising the whitelisted commands comprises making at least one revision to the control commands of the whitelisted commands via the secure communication link between the operator device and the jump host; and
    wherein the secure communication link comprises confirming an identity of a human operator operating the operator device.

4. The computer-implemented method according to claim 1, wherein the control commands of the whitelisted commands each comprises a unique syntax string identifier that differentiates the control commands of the whitelisted commands from each other; and
    wherein the modifying action of the first control command comprises an action resulting in a change in value of at least one of:
    a manipulated variable associated with the operation of the industrial machine; and
    a controlled variable associated with the operation of the industrial machine.

5. The computer-implemented method according to claim 4, further comprising the steps of:
    receiving, at the jump host, a second control command via the network;
    determining, at the jump host, whether the second control command is contained within the whitelisted commands;
    in response to a negative determination that the second control command is not contained within the whitelisted commands, deeming the second control command as being unauthenticated; and
    in response to being deemed unauthenticated, preventing the second control command from being transmitted to the unit controller of the industrial machine.

6. The computer-implemented method according to claim 5, further comprising the steps of:
    logging within the memory of the jump host a record of the authenticated first control command and a record of the unauthenticated second control command; and
    in response to a query sent from the operator device via a secure communication link, transmitting to the operator device via the secure communication link the record of the authenticated first control command and the record of the unauthenticated second control command.

7. The computer-implemented method according to claim 1, further comprising the step of transmitting the respective unique syntax string identifiers corresponding to one or more of the control commands of the whitelisted commands to the command issuer.

8. The computer-implemented method according to claim 1, wherein the control commands within the whitelisted commands are based on past control commands issued to the unit controller of the industrial machine;
wherein the industrial machine comprises at least one of:
a gas turbine; a steam turbine; and a combine cycle power plant having a gas turbine and a steam turbine; and
wherein the first control command comprises at least one of: an output generating level; a set point for a manipulated variable; a set point for a controlled variable; and a change to at least one of a turndown mode and a shutdown mode of operation.

9. The computer-implemented method according to claim 1, wherein the command issuer comprises an analytic program operating on a computer system that is remotely located in relation to the industrial machine, the analytic program comprising an algorithm for enhancing a performance of the operation of the industrial machine.

10. The computer-implemented method according to claim 1, further comprising the steps of:
storing within a memory of the cloud application the whitelisted commands;
subjecting the first control command to an initial screening test at the cloud application; and
storing, at the cloud application, the first control command for transmission to the jump host only if the first control command passes the initial screening test;
wherein the initial screening test comprises:
determining whether the first control command is contained within the whitelisted commands; and
in response to an affirmative determination that the first control command is contained within the whitelisted commands, deeming the first control command as having passed the initial screening test.

11. The computer-implemented method according to claim 10, further comprising the step of transmitting information to the command issuer that enables the command issuer to access the cloud application.

12. A system for controlling an operation of an industrial machine that includes authenticating control commands remotely issued by command issuers through a network, the control commands each describing a modifying action that modifies the operation of the industrial machine, the system comprising:
the industrial machine;
a unit controller operably connected to the industrial machine for the control thereof;
a jump host that comprises a communication buffer between the unit controller and the network;
one or more hardware processors; and
a machine-readable storage medium on which is stored instructions that cause the one or more hardware processors to execute a method that includes:
maintaining whitelisted commands within a memory of the jump host, the whitelisted commands comprising a list of the control commands that are approved;
receiving, at the jump host, a first control command via the network;
determining, at the jump host, whether the first control command is contained within the whitelisted commands, wherein the step of determining whether the first control command is contained within the whitelisted commands comprises:
determining a unique syntax string identifier for the first control command; and
comparing the unique syntax string identifier of the first control command against the unique syntax string identifiers of the control commands within the whitelisted commands and, therefrom, determining whether the unique syntax string identifier of the first control command exactly matches any of the unique syntax string identifiers of the control commands within the whitelisted commands;
in response to an affirmative determination that the first control command is contained within the whitelisted commands, deeming the first control command as being authenticated;
in response to being deemed authenticated, transmitting the first control command to the unit controller of the industrial machine;
providing a cloud application through which the control commands are routed in transit between the command issuer and the jump host, the cloud application being accessible via the network;
receiving at the cloud application the first control command issued by the command issuer;
storing the first control command within a memory of the cloud application;
periodically sending a query from the jump host to the cloud application regarding whether the cloud application has a stored one of the control commands that has not already been transmitted to the jump host; and
in response to the query from the lump host, transmitting the first control command from the cloud application to the jump host; and
receiving, at the unit controller, the first control command; and
using the unit controller to implement the modifying action of the first control command in controlling the operation of the industrial machine.

13. The system according to claim 12, wherein the modifying action of the first control command comprises an action resulting in a change in value of at least one of:
a manipulated variable associated with the operation of the industrial machine; and
a controlled variable associated with the operation of the industrial machine.

14. The system according to claim 12, wherein the control commands of the whitelisted commands each comprises a unique syntax string identifier that differentiates the control commands of the whitelisted commands from each other; and
wherein the network comprises a wide area network.

15. The system according to claim 12, wherein the method further comprising the steps of:
storing within a memory of the cloud application the whitelisted commands;
subjecting the first control command to an initial screening test at the cloud application; and
storing, at the cloud application, the first control command for transmission to the jump host only if the first control command passes the initial screening test;
wherein the initial screening test comprises:

determining whether the first control command is contained within the whitelisted commands; and in response to an affirmative determination that the first control command is contained within the whitelisted commands, deeming the first control command as having passed the initial screening test.

\* \* \* \* \*